United States Patent [19]
Russell

[11] 3,864,043
[45] Feb. 4, 1975

[54] ANGULAR DEVIATION MEASURING DEVICE AND ITS METHOD OF USE

[75] Inventor: James T. Russell, Richland, Wash.

[73] Assignee: The United States of America as represented by the Secretary of the Interior, Washington, D.C.

[22] Filed: Nov. 30, 1973

[21] Appl. No.: 420,509

Related U.S. Application Data

[63] Continuation-in-part of Ser. No. 302,959, Nov. 1, 1972, abandoned.

[52] U.S. Cl. ............... 356/152, 356/141, 356/163, 356/172
[51] Int. Cl. ............................................. G01b 11/26
[58] Field of Search ........... 356/141, 152, 163, 138; 250/220 M

[56] References Cited
UNITED STATES PATENTS

| | | | |
|---|---|---|---|
| 3,379,887 | 4/1968 | Stephany | 356/152 |
| 3,558,230 | 1/1971 | Fowler | 356/152 |
| 3,638,006 | 1/1972 | Hogan | 250/220 M |

Primary Examiner—Maynard R. Wilbur
Assistant Examiner—S. C. Buczinski
Attorney, Agent, or Firm—Thomas Zack

[57] ABSTRACT

A high resolution measuring device and its method of use that utilizes a spatially modulated beam, like a laser beam, to determine orientation deviations of a device. The angular deviations are determined by comparing prior preestablished standards for specific orientation settings with subsequent readings for the same settings. A reference phase detector determines the modulation intensity phase for both readings. Thereafter, a reference mask with a second detector detects the intensity of the beam after it is reflected from the device. A phase meter then compares these two detector readings for each angular device orientation. By comparing different sets of readings for the same specific orientations variations for correction purposes may be noted.

9 Claims, 7 Drawing Figures

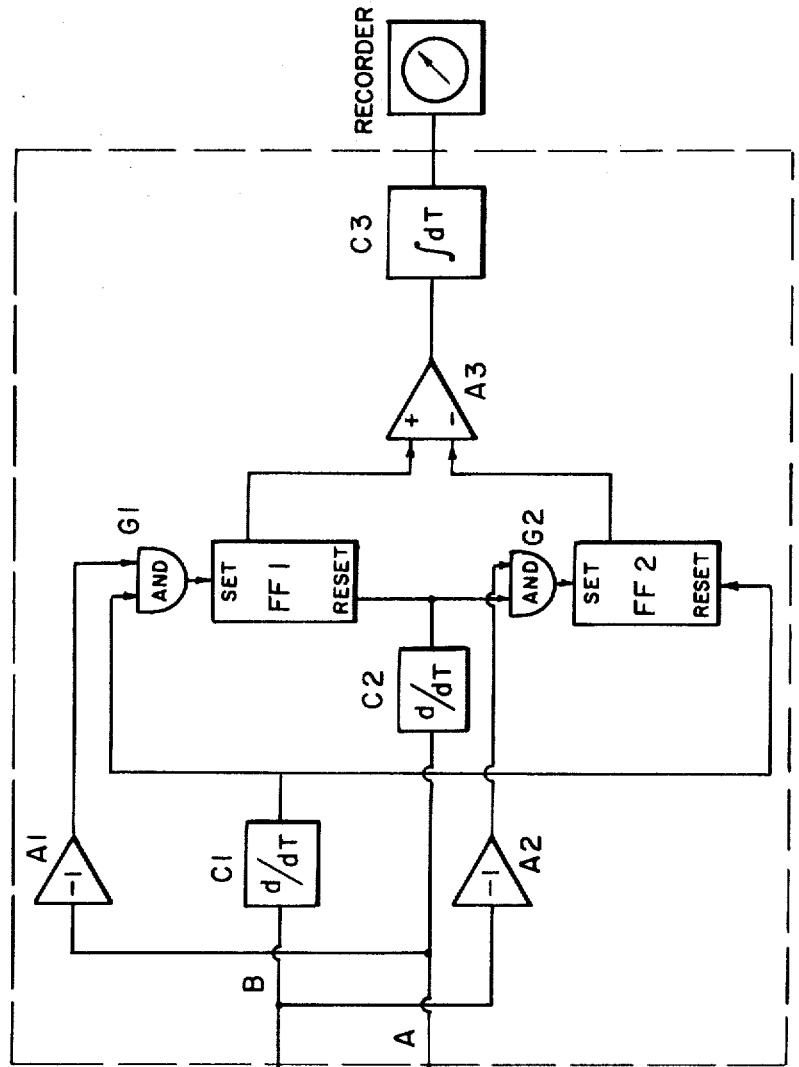
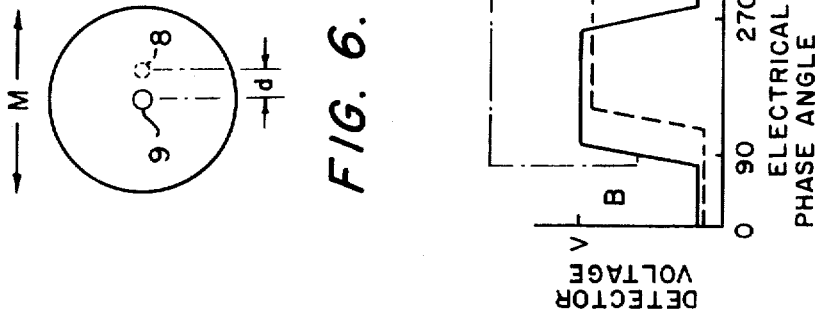
FIG. 6.
FIG. 7.

ANGULAR DEVIATION MEASURING DEVICE AND ITS METHOD OF USE

This application is a continuation-in-part of application having Ser. No. 302,959, filed Nov. 1, 1972, now abandoned.

BACKGROUND OF THE INVENTION

This invention relates to a correction device that determines the deflection of an electromagnetic beam relative to its own prior orientation. More specifically, my invention determines deviations of a spatially modulated beam by comparing two phase difference readings with each other for the same deflector angular setting.

Beam deflection systems that use an optical feedback system to monitor the position of the deflected beam from a reference direction are known. In some of such systems beam splitters have been used in conjunction with a reference detector to sample a section of the transmitted beam to measure deflections. Normally, the reference detector detects a phase shift that is a characteristic of an image carried by the split beam. A Ronchi ruling system may be used to generate the phase difference such as that described in the U.S. Pat. No. 3,558,230 issued jan. 26, 1971 to V. J. Fowler.

In my invention the spatially modulated beam itself carries information from which its position may be determined. This eliminates the precision previously needed when Ronchi rulings have been used as incremental encorders to determine the beam position starting from a fixed position of measure on the ruling. The reference mask of my invention the angular deflection of the beam to an absolutely determined phase shift, and as a result may be termed an absolute encoder. Once the beam is reflected off the deflector and one of its segments impinges through a hole in the reference mask, the location of the beam relative to the fixed hole can be determined.

SUMMARY OF THE INVENTION

This invention is a system for determining beam deviations of a spatially modulated beam which is modulated substantially perpendicular to its transmission direction. The spatial modulation phase difference between a reference detector and a reference mask detector are noted and compared to prior phase difference readings for the same angular setting of a beam deflector. The reference mask detector is associated with a directed beam through a reference mask which can be directly sent to the mask or be a split off segment from the transmitted beam. By comparing the phase difference between the reference and reference mask detector reading a standard can be established against which subsequent readings for the same deflector setting can be compared to determine deviations.

The primary object of this invention is an improved detecting system to precisely note deviations of a deflected beam.

An additional object is the steps taken to actually determine these deviations.

FIG. 1 schematically illustrates the preferred embodiment of my present invention combined with my beam measuring system.

FIG. 6 is illustrates how the beam diameter and electric phase readings relate.

FIG. 7 shows how the phase meter is used to process the reference and mask detector signals.

Figure 1:
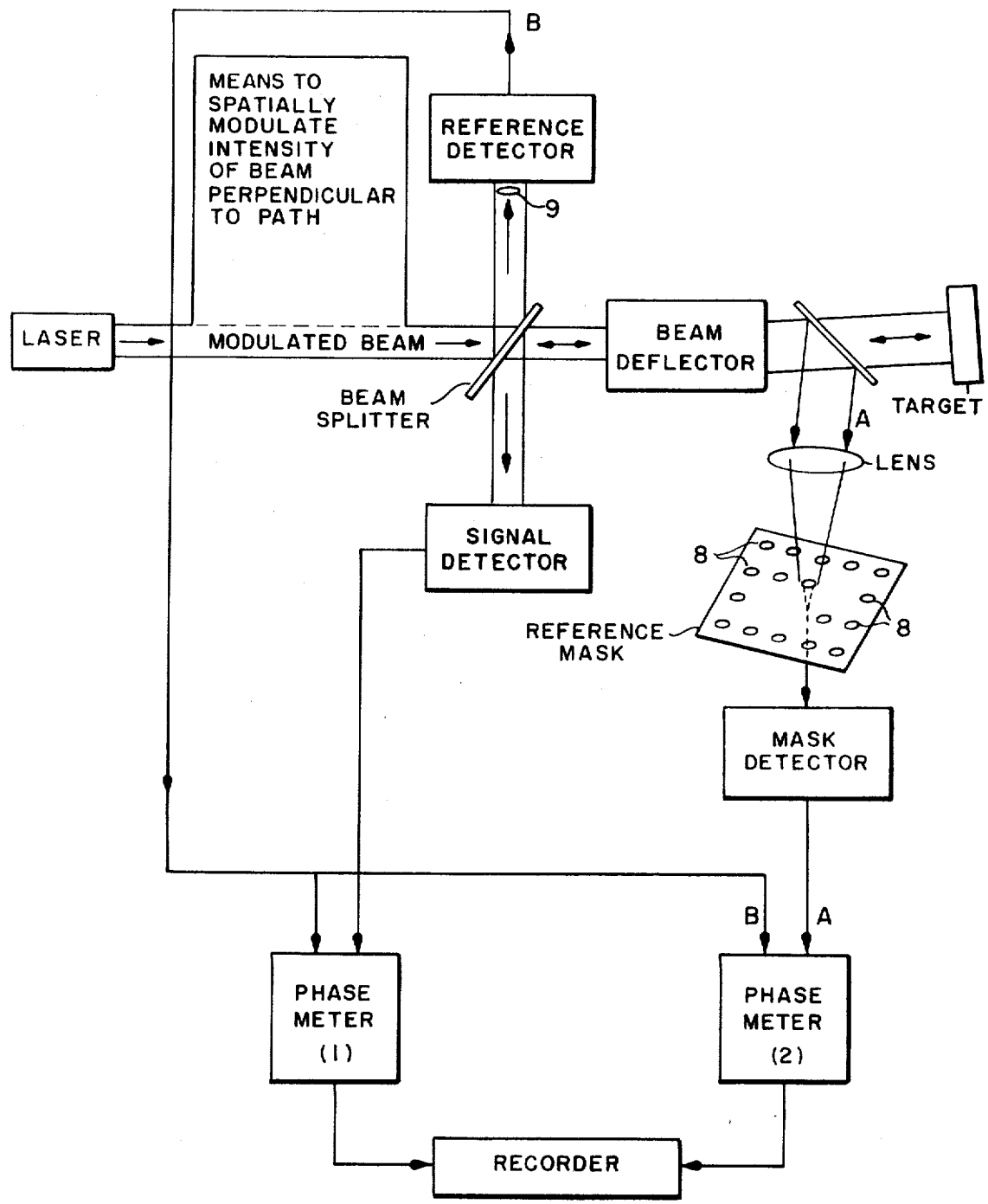

In the preferred embodiment the electromagnetic beam is a laser beam that has been collimated and then spatially modulated substantially perpendicular to its transmission direction. My copending U.S. patent application entitled MEASURING APPARATUS FOR SPATIALLY MODULATED REFLECTED BEAM and having Ser. No. 302,960, which was filed on Nov. 1, 1972 now U.S. Pat. No. 3,809,477, describes how the beam is collimated and spatially modulated. Part of this disclosure is set forth herein for a better understanding of the invention. This same application also dislcoses how the beam may be used to measure angular measurements or linear distances within the beam itself depending on whether or not the beam is divergent or parallel, respectively. The signal detector and its associated beam splitter, phase meter 1, as well as the remote target form part of my other invention which is illustrated in FIG. 1 to merely show how it may be used with the present invention.

Figure 3:
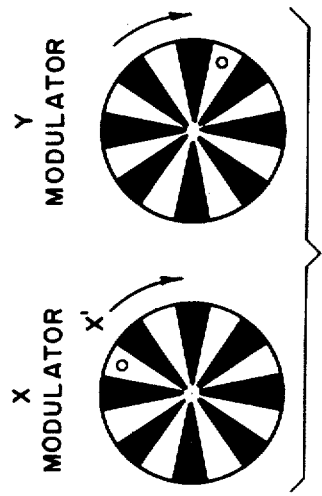
FIG. 3 shows one way that the beam may have its intensity spatially modulated.
Figure 4:
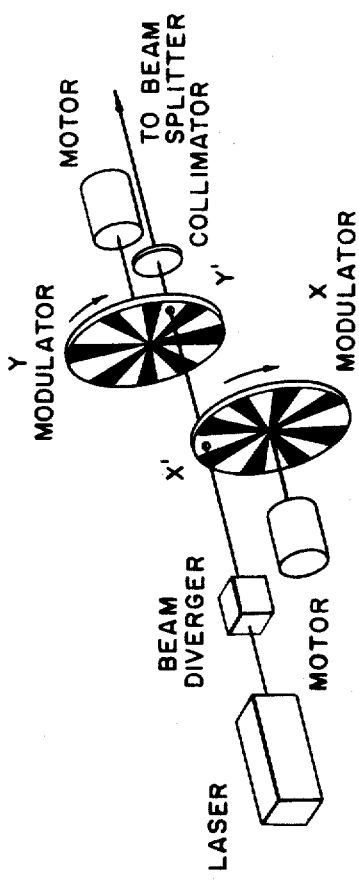
FIG. 4 is a front view of the modulators used in FIG. 3.

In my mentioned copending patent application having Ser. No. 302,960, filed Nov. 1, 1972, two types of apparatus for spatially modulating the intensity of the beam are described. FIGS. 3 and 4 illustrate one of these types of apparatus described in my other application. The X and Y modulators are basically the same and consist, in the shown embodiment, of two parallel circular wheel members with each member being rotated by a separate variable speed motor. The wheels have their largest surface in parallel vertical planes but their center axes in different horizontal planes. The laser beam intersects the X modulator wheel perpendicular to its transmitted direction near the wheel's rotating outer edge. The Y modulator also intersects the same beam perpendicular to the direction of its transmission but has its center axis in a lower horizontal plane that is in the same vertical plane as the laser beam. FIG. 4 illustrates how these intersections take place by showing a front view of the laser beam as viewed from a distant target and how the modulators are oriented with respect thereto. The points of intersection X' and Y' for modulators X and Y, respectively, are set about 90° apart from each other to give the desired modulation.

Each modulator wheel consist of alternate laser transmitting and blocking opaque segments (see FIG. 3) that are of the same width when measured the same distance out from the modulator center axis. As the motor for each modulator rotates its respective wheel about its central axis, the transmitted laser beam is spatially modulated in the X and Y direction. As is usually the case, if the speed of each modulator wheel is made different from the other, the temporal frequency of spatial modulation intensity will be different for the two coordinates directions.

It is important to note that the basic laser beam has not had its transmission frequency changed. The laser beam acts as a carrier beam that has it intensity modulated perpendicular to its direction of transmission. When observed from a target, as will be described with respect to FIG. 5, the beam would appear to have shadows passing across it at a frequency dependent on the speed of rotation of the modulator wheels. It is the progression of this variation in intensity perpendicular to the transmitted beam at different coordinate frequencies which constitutes the spatial modulation.

After the transmitted laser beam is modulated it impinges upon a beam splitter. As the name indicates, this device splits the beam into at least two segments, one of which is transmitted in a straight line and another of which is split off. The back of this device can also serve the function of diverting a portion of the reflected beam from a target. A semitransparent mirror may be used to accomplish this purpose of splitting and transmitting the beam.

One of the split-off beam segments is fed to a transmitter phase detector positioned perpendicular to the path of the transmitted beam. A photomultiplier tube may function as the detector or other equivalent devices such as a silicon solar cell, phototransistor, or PIN diode could also be used as the detector. Background room lights and other sources of interference may also be reduced by a narrow band pass filter. Whatever type is used the function of this first detector, also referred to as a reference detector, is to detect the phase of the spatial modulation of the beam before it reaches its target. It also defines the center lines of the beam for reference purposes.

Opposite the first detector is a similar second detector, referred to as the signal detector, that receives part of the reflected beam back from the target after it strikes the mirror on the back of the beam splitter and detects its spatially modulated phase. It forms no part of this invention. As is the case with the reference detector, photomultiplier tube or its functional equivalent could be used for the signal detector. Readings from the reference detector and signal detector are fed to a common phase meter (1) which measures the electrical phase relationship between the two beams.

The other detector of interest is the mask detector. It is an essential part of this invention and functions along with readings from the reference detector to give an input to phase meter (2). Hence, the primary concern of this invention is directed to the reference detector, the mask detector, phase meter (2) and the associated devices used therewith as will be described.

Each of the described detectors, whether it be a reference signal detector, or mask detector, is concerned with detecting the spatial modulation in only one of the X or Y coordinate directions. Two sets of tuned band pass filters would be needed to separate the different frequencies in the X and Y directions. Readings on the detectors would be in volts (FIG. 4) and about five volts peak to peak with a time frequency of about 0.005 seconds peak to peak. However, it is not the actual voltage readings from the detectors that is important but the phase relationship or absolute phase difference between two sets of detector readings--one set for each of the coordinates.

After the beam has had its intensity spatially modulated and the initial phase of the modulated beam detected by the reference detctor in its path, it can be deflected to a remote reflective target, such as a corner cube target or tetrahedral prism target. Should there be several of these targets randomly fixed to the surface of a rigid structure, a beam deflector may be used to aim or deflect the beam sequentially at the individual targets through various angular directions. Part of the reflected beam may also have its modulation phase detected for comparison purposes with the reference detector by the signal detector.

The present invention concerns itself with problems of maintaining a very high degree of mechanical reproducibility in aiming the beam deflector unit at individual targets. By establishing a standard reference set of readings, one for each deflector setting, and comparing this set against subsequent readings for the same deflector settings deviations may be noted.

Figure 2:
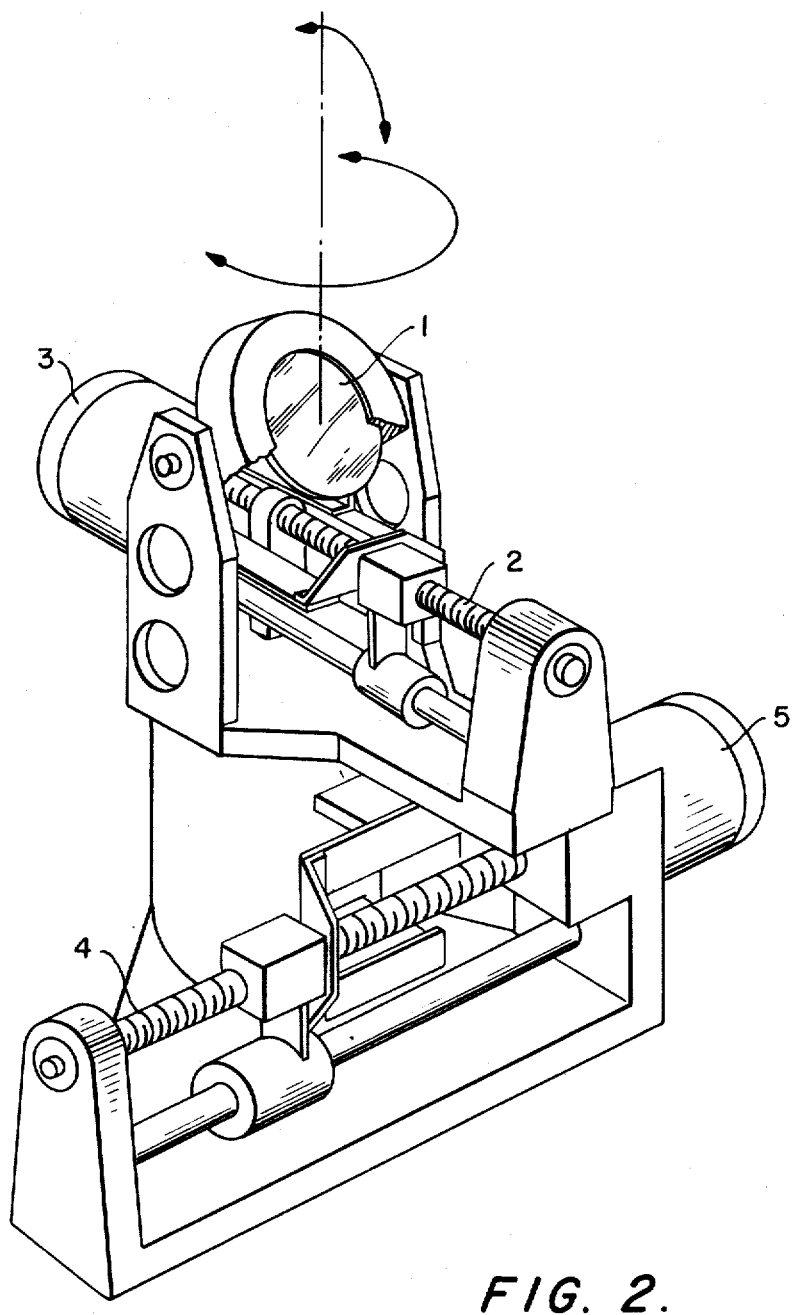
FIG. 2 shows the beam deflector of FIG. 1 in detail.

The FIG. 2 drawing shows one type of deflector that can be used for the block entitled beam deflector in FIG. 1. A circular mirror 1 that deflects the beam is oriented in a vertical or Y aiming direction by a stepping motor 3 that rotates a ball screw 2. The motor may be of the type that the different lengths for each step of several steps or of the same fixed length for each step. By knowing the step length and the reproducibility of the step lengths, the particular goal ratio for reproductibility may be compared against the actual results to determine if the goal has been met. Likewise, the ball screw 4 is rotated by a separate stepping motor 5 to provide for horizontal or X direction movement of the aiming mirror 1. Specific settings of the number of step lengths of a specific X and Y coordinate would constitute one setting and would, if there were no reproductibility errors, give the same angular deflection for a beam each time. Unfortunately mechanical errors within the deflector unit prevent the repeatability precision desired.

Rather than concentrate my total efforts on attempting to improve the mechanical precision of the deflector unit parts like the ball screws, stepping motors and other devices, the scheme chosen has been to refine these mechanical devices to an acceptable degree of precision and then to concentrate my efforts on measurements of the beam error. To do this a reference mask concept has been developed.

Essentially the reference mask concept is used to note corrections or actually correct the beam when it deviated from a preestablished standard. It does this by feeding back a beam signal from the deflector by means of a beam splitter or a mirror fixed to the deflector. The letter A in FIG. 1 represents this beam. A lens is then used to transmit beam A to and through a reference mask that has at least one hole. It should be noted that the term "hole" as used in this disclosure includes not only apertures that extend through a solid surface but also any type of beam transmitting medium in a solid surface. Next, the split off beam portion passes through the reference mask hole to a phase detector that determines the spatial modulation phase. This modulation phase of beam A is then compared against the reference detector phase, previously obtained by phase meter 2 (FIG. 1) to determine where the reference mask hole is relative to the reference detector. In other words, the phase difference should remain the same for a specific setting of the deflector as all deflector movements, theoretically, involved are the same each time the same angular orientation setting is used again.

The reference mask may have only one hole but preferably has a large number arranged in a row and column or an X-Y hole format which corresponds to the scan angles of the deflector. As an example of how the reference mask concept could work, initially the phase difference between the readings on the reference phase detector and reference mask detector can be noted and recorded in the FIG. 1 recorder when a specific target has the center of the beam shown on it. Then other targets could sequentially have their phase differences noted as the center of the beam impinges on each. Since the reference mask and its associated detector are fixed relative to the reference detector, and the time it takes for a beam to travel is ignored, variations in subsequent readings can be attributed to reproducibility errors of the intervening deflector movement. Thus, should the initial phase difference between the reference and mask detectors be zero for a specific deflector setting when the center of the beam is directly on the target, then subsequent phase difference readings greater than zero for the same setting would indicate the beam is off the target center. The greater the phase the greater would be the distance off and the greater the amount of correction required.

A data retrieval system could store prior phase difference readings of each deflector setting, where each setting corresponds to the beam center impinging a target, could be used to print out the amount of correction that has been detected and this result could be correlated to a specific number of deflector step positions of the stepping motor or settings of the deflector. Only one hole could represent a specific number of steps or a set of specific deflector settings.

As previously indicated the number of holes in the reference mask can vary from one on up. By increasing the number of holes a more precise measurement can be made with a wider deflection angle. Each hole can be used to make a measurement with an accuracy of about one part in 2000. This limit is set by the accuracy of the electronic phase detector. If greater accuracy is needed, more holes will be required. When beam A is transmitted through the lens shown in FIG. 1 the lens makes the beam converge. Before the beam focuses, it passes through a single hole in the reference mask which hole is associated with a specific setting of the beam deflector.

Figure 5:
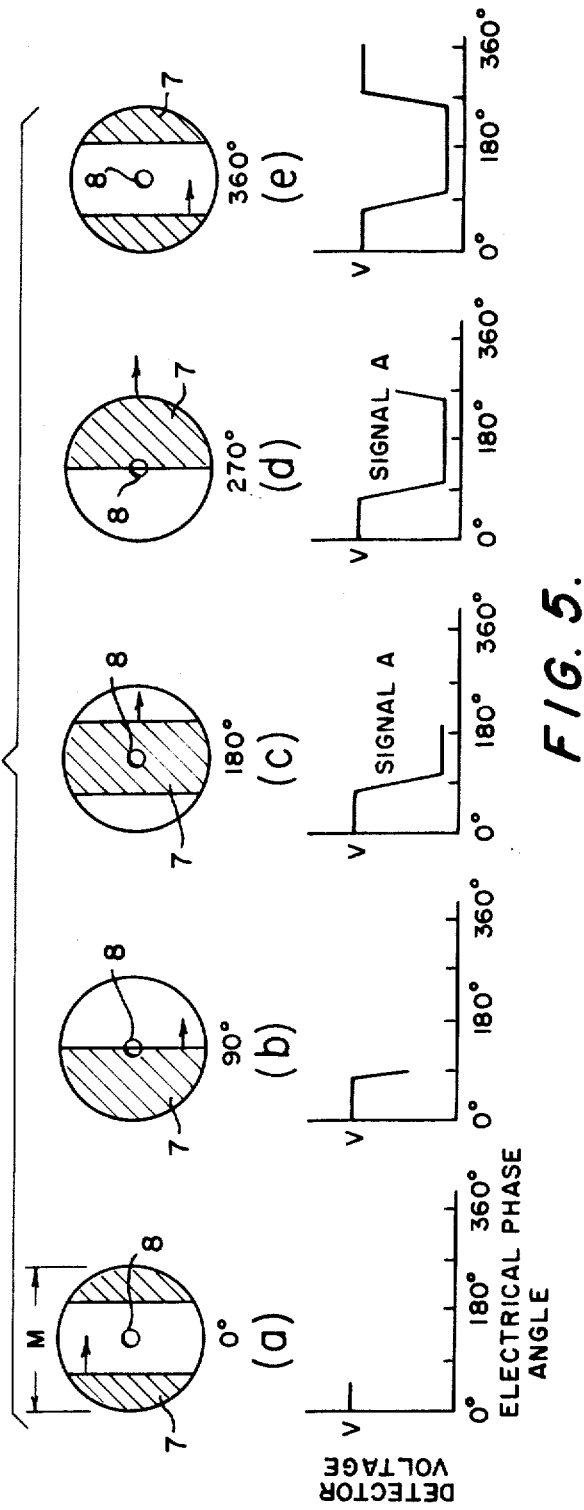
FIG. 5 is a graph relating time and phase to the modulated beam.

FIG. 5 illustrates what is happening as the spatially modulated beam strikes the mask. For simplicity purposes only the X spatial modulator is shown. The Y modulation is occurring at the same time but at a different frequency from the X modulation and would be superimposed in its effect upon the illustrated X modulation. The Y modulation would travel as a shadow from the top of the FIG. 5 beam downwardly in a repeating pattern. The X modulation results in a shadow 7 passing from left to right, as viewed in FIG. 5, across the diameter M of the beam. The beam diameter is several times larger than the diameter of mask hole 8. Each of these holes is so spaced in the reference mask surface that only one hole is impinged by the beam at a given time. At position (a) the electric phase angle is 0° and the moving shadows 7 straddle the hole and produce the maximum voltage reading on the reference mask detector (if the hole 8 were considered an aperture before the reference detector, similar reference detector voltage readings would be observed). When the shadow has moved to position (b), representing an electrical phase angle of 90°, it covers part of the hole 8 causing the mask detector voltage to drop. Thereafter, at an electrical angle of 180° (c) the detector voltage reaches its lowest level until the shadow moves to position (d). At this latter position (270°), the beam is again shining directly on part of the hole and the detector voltage increasing. The last position is like the (a) position since in the (c) position (36°), the shadow has moved completely away from the hole and the maximum voltage detector reading is obtained.

The important thing, however, is not what FIG. 5 shows but the phase difference detected in phase meter (2) of FIG. 1. FIG. 6 is an attempt to illustrate by using a schematic illustration of what happens at a given instant of time. At this time, if the speed of light is ignored, the beam having a diameter M impinges simultaneously on an aperture 9 in front of the reference detector and at another portion along its transmission path after it is deflected on a hole 8 of the reference mask. Physically of course, aperture 9 and hole 8 are as depicted in FIG. 1. All FIG. 6 is doing is showing their effect. As shown, aperture 9 is arbitrarily fixed to coincide with the beam's center. Should the centers of hole 8 and aperture 9 happen to be spaced aprat a distant d equal to 1/6 the diameter of the beam, the detected electrical phase angle recorded by phase meter (2) would represent 60°. Likewise, if the distance d between them was 1/2 the beam diameter, the phase difference angle would be 180° i.e., 360° multiplied by the ratio ($d/M$) of the distance d between aperture 9 and hole 8 over the distance of the beam's diameter M. Thus, it should be apparent that for a specific setting of the beam deflector values from 0° to ±180° are possible for the phase difference readings as the distance d varies. Extremes of 0° and ±180° will be noted when the apertures 9 and hole 8 coincide in position at the beam's center (0°) and when the hole 8 moves to the edge of the beam's periphery relative to the fixed aperture 9 (±180°). If the hole 8 moves outside the periphery of the beam, the phase difference is undefined. The electrical angles can also be thought of as a time axis whose scale depends on the speed of spatial modulation of the intensity. For example, if the modulation were 300 cycles per second across the beam then 3.3 milliseconds would equal 360° i.e., this is the time it would take to move the modulation totally across the beam.

Once the electric phase differences are initially determined, with one for each specific setting of the beam deflector, all that need be done is to note and compare future angular phase difference readings for the same specific set of initial settings. Any variations in phase difference readings tell an observer that the beam deflector is, for some reason, not in the same position as it was originally. Corrections are then made to compensate for these variations.

FIG. 7 shows one possible set up for the phase meter (2) of FIG. 1. The graph on the left side shows voltage signals A and B from the mask detector and reference detector, respectively, being sent to the phase meter. Signal B is first sent to amplifier A2 which sets as an inverter and to a series capacitor C1 which acts as a voltage differentiator to give dv/dt at its output. This output is then sent to AND gate G1 and set/reset flip-flop FF2 which is triggered by the positive edge of the wave. The output from inverter A2 is sent to AND gate G2. Signal A from the mask detector is sent to amplifier inverter A1 and the series capacitor C2 which, like capacitor C1, acts as a voltage differentiator to give dv/dt at its output. From capacitor C2 a signal is sent to the reset side of flip-flop FF1 and to the input of AND gate G2. Like flip-flop FF2, flip-flop FF1 is switched by the positive leading edge of an incoming signal to either turn on (set) or off (reset) depending on which side of it is actuated. Should a negative or positive signal be outputted from either of the flip-flops, it is sent to differential amplifier A3. A signal from flip-flop FF2 would result in a negative square type wave being outputted by the amplifier A3 and a signal from flip-flop FF1 a positive wave output. The duration of this wave from amplifier A3 would be directly proportional to the phase difference between signals A and B because it length would depend on the time between which the flip-flop are switched to set and reset. This output from amplifier A3 is next sent to the capacitor C3 which acts as an integrator of this output wave. Lastly, a recorder, shown as a block in FIG. 1, can record the amount of charge on integrator C3 to tell an observer the amount of phase difference detected.

From the structural and functional details described, the operation of phase meter (2) appears straightforward. For example, it should be clear that its function is to output a positive or negative wave form whose duration or length is proportional to the phase difference between incoming detector signals A and B. It accomplishes this function by switching two flip-flops to a set (on) or reset (off) state to give a positive wave (flip-flop FF1 set) or negative wave (flip-flop FF2 set). Two AND gates actuated by positive leading edges in turn control this switching to a set state based on whether signals A or B have reached certain voltage values or are changing voltage values. Thus, to actuate gate G1 and set flip-flop FF1, signal A must be at its Vmin value (binary "0") so inverter A1 will output a voltage representative of a binary "1" to the gate G1 at the same time signal B is changing (i.e., 90° or 270° in FIG. 7). Once this occurs gate G1 will remain set until it is reset by a changing voltage from signal A (about 135° or 315° in FIG. 7). Similar reasoning will indicate when gate G2 is made to actuate or set flip-flop FF2 and cause a negative pulse to be imputted to differential amplifier A3. The AND gates are used to sort out which of the two imput signals A or B arrived at the meter first. The differential amplifier A3 is used to substract the two detected pulses from flip-flop FF1 and FF2 and output a negative or positive wave whose pulse length is equal to the phase difference. The integrator C3 outputs a signal whose amplitude is proportional to the detected phase difference with the appropriate sign.

Looking at the graph of FIG. 7 it is observed signal B is leading signal A in time with an electrical phase difference of about 45°. Both signals have the same detector voltage maximum, Vmax, and voltage minimums, Vmin. For signal A the FIG. 7 graph is offset from the FIG. 5 graph in that the voltage maximums for signal A are reached in the 150° to 330° region in FIG. 7 and in 0° to 90° and 270° to 360° regions in FIG. 5. When the leading positive edge of signal B in FIG. 7 arrives at the phase meter it is about 105° to 45° in front of the 150° for signal A. Because of the phase meter set up this will result in gate G1 being made by this edge, flip-flop FF1 being set, and a positive pulse being sent by amplifier A3. The duration of this pulse will continue until signal A's edge at 150° is sensed via capacitor C2 to reset flip-flop FF1. At this time amplifier A3 would have outputted a positive wave proportional to this detected 45° phase difference.

Besides the described phase meter (2) of FIG. 7, which may be called a logic type, there is another type called a synchronous rectifier or demodulator, or balanced demodulator that may also be used just as well. This other type may employ a diode bridge and will not be described herein. The important point is that the phase meter be able to detect the phase difference between two incoming waves and output a wave proportioned to this difference not the circuitry used to do this function.

The heretofore disclosed invention corrects for deviations in the beam itself by recording these variations and using this data as a correction factor in calculation or manual adjustments to the deflector. It also could, of course, be used as a data feedback imput signal to the stepping motor to directly correct for variations by activating the motor the desired number of correction steps.

The contrast between the subject matter of this invention and that disclosed in my above referred to patent application should be clear. Here the main purpose is to determine variations in the direction of a deflector that is being aimed by establishing a predetermined reference reading and noting subsequent readings. This done by generating an internal beam (i.e., internal to the deflector system) which is spatially modulated susbtantially perpendicular to its direction of travel, detecting its modulation phase at a beam section, deflecting this beam from a deflector, then diverting a portion of the beam into a reference mask. This latter beam portion is next transmitted by a directing lens through an aperture of the beam transmitting mask after which its phase is determined. A phase difference detector would then be used to record the phase difference between the two detectors and lastly the prior preestablished standard readings from the phase meter for the same setting would be compared. In my other application, the main purpose was to measure either an angle or a beam distance based on data supplied by the external reflected beam from a remote target. Both inventions could and have been combined.

While reflective targets are not needed in this invention, if both of my inventions are used, the targets can be reflective corner cube targets with small (0.2 inch) center slits that are rigidly attached to the interior wall of a mine or other structure. The width of the target center slit is not critical as long as the slit width is less than a modulation wavelength. In such an arrangement, the deflector could be constantly aimed to reflect a source of a spatially modulated parallel beam, like a laser beam, at each target in a predetermined order. Readings would allow for a determination of the precise distance between separate targets. Wall deformations of an extremely small degree could be noted over an extended period of time to alert the operator of even the smallest variation. The precision reproducibility data obtained by this invention would insure the correctness of the totality of data obtained by recording the deflector errors that occur as the deflector scans the external transmitted beam.

It should be emphasized that although an example has been discussed in which both of my inventions have been used together they are mutually exclusive of each other. In fact, this present invention is usable to not only measure the deviations from a spatially modulated deflected beam, whether it be divergent or parallel, that is being aimed at a remote target but, also to measure the location or reproductibility of any device that moves in an angular fashion. That is to say, it is not the transmission of an external optical beam from the deflector to the target, which is a necessary condition of this invention. It is the internal deviations from a preestablished standard between the reference detector and reference mask detector as related to a specific angular setting that are important not what is or is not transmitted from the device whose angular orientation is involved. The device may or may not even transmit an external beam. In any event, none of the specific disclosed embodiments or disclosed uses should be used to limit the scope and extent of this invention which is to be measured only by the spirit of the claims which follow.

I claim:

1. A system for determining angular deviations of a device comprising:
   a source of a spatially modulated electromagnetic beam that has its intensity modulated substantially perpendicular to the transmission path of the beam;
   a reference detector placeable in the path of the beam for determining the spatial modulation phase of a beam section;
   a deflector placeable in the path of the beam for directing the beam through various angular orientations corresponding to specific orientation settings of the deflector;
   means placed in the beam path for diverting a first portion of the beam after it is deflected;
   a reference mask with at least one beam transmitting area;
   means for transmitting the first portion of the beam through the mask transmitting area;
   a reference mask detector for detecting the spatial modulation phase in the beam after the first portion passes through the mask; and
   means for comparing the phase difference between the reference detector and mask detector to allow for the determination of the angular deviation of the deflector from a prior reading for the same deflector setting.

2. The system of claim 1 wherein the source comprises a laser source whose intensity is modulated by rotating members in the beam's path.

3. The system of claim 1 wherein the deflector comprises a mirror whose reflected angle may be varied in the horizontal and vertical plane by motor means.

4. The system of claim 3 wherein the motor means comprises two separatably operable motors each of which operate a screw member that moves the mirror.

5. The system of claim 1 wherein the reference mask has a plurality of beam transmitting areas arranged in rows and columns and the means for transmitting the first beam portion through the mask comprises a lens.

6. The system of claim 5 wherein the transmitting areas are holes through a solid mask surface.

7. The system of claim 1 wherein there is only one beam transmitting area associated with a single deflector setting.

8. A method for determining the angular deviation of a beam comprising the steps of:
   generating a beam that is spatially modulated substantially perpendicular to its direction of transmission;
   detecting the modulation phase of the beam;
   impinging the beam on a beam deflector for a specific setting of the deflector;
   directing a first portion on the beam impinged on the deflector to a reference mask;
   detecting the spatial modulation phase of said first beam portion after it is transmitted through the mask;
   determining the phase difference between the modulation phase and the phase of the first portion of the beam; and
   comparing the phase difference obtained with prior phase differences obtained by the same method for the same deflector setting to determine any deviations.

9. The method of claim 8 wherein the step of generating a beam further includes the step of generating a parallel light beam.

* * * * *